O. C. FRICK.
COMMINUTING FEED CUTTER.
APPLICATION FILED JULY 19, 1915.
1,180,835.
Patented Apr. 25, 1916.
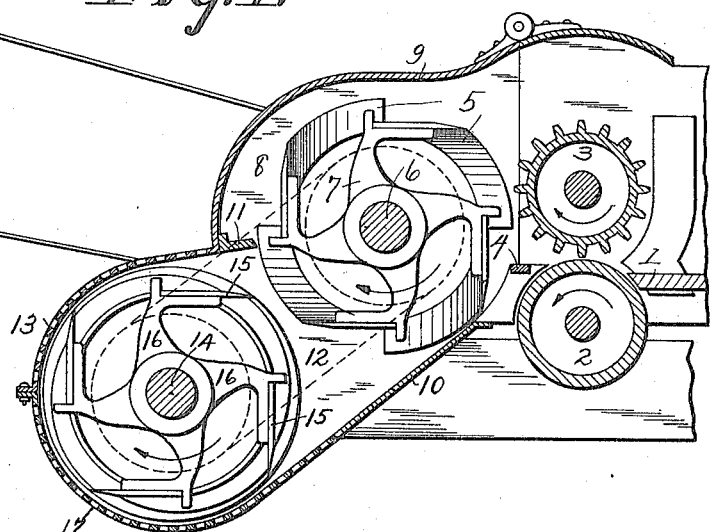
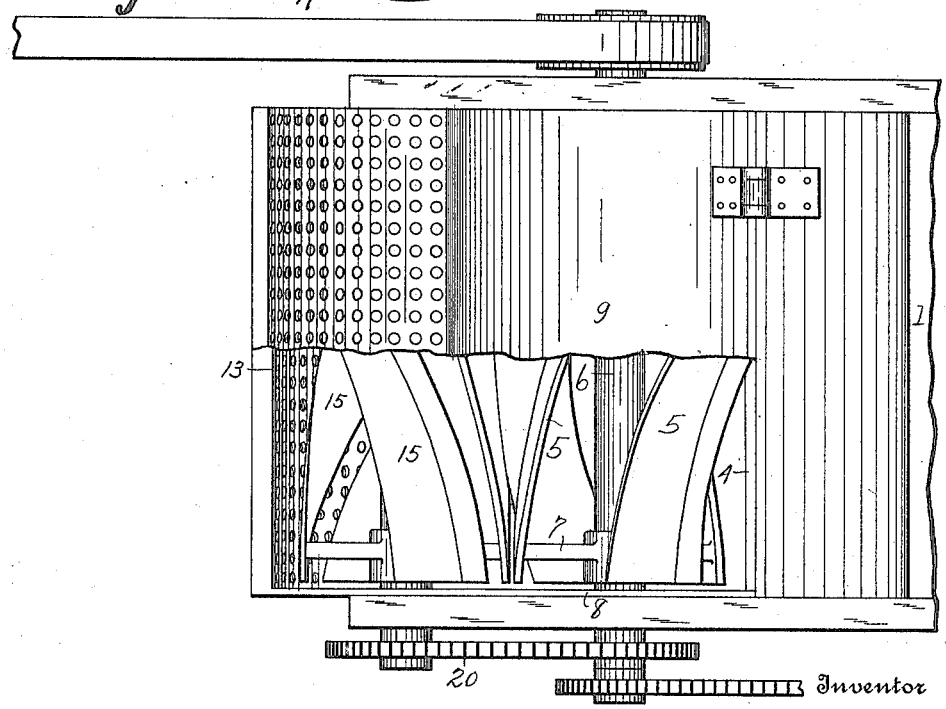

UNITED STATES PATENT OFFICE.

ORLANDO C. FRICK, OF MANITOWOC, WISCONSIN, ASSIGNOR TO SMALLEY MANUFACTURING COMPANY, OF MANITOWOC, WISCONSIN, A CORPORATION OF WISCONSIN.

COMMINUTING FEED-CUTTER.

1,180,835.  Specification of Letters Patent.  Patented Apr. 25, 1916.

Application filed July 19, 1915. Serial No. 40,589.

*To all whom it may concern:*

Be it known that I, ORLANDO C. FRICK, a citizen of the United States, residing at Manitowoc, county of Manitowoc, and State of Wisconsin, have invented new and useful Improvements in Comminuting Feed-Cutters, of which the following is a specification.

My invention relates to improvements in comminuting feed cutters.

In the ordinary feed cutter a set of helically curved blades are revolved about a common axis across the face of a suitable shear bar over which the material to be cut is fed. The cut material, however, is not delivered in a vertical plane which includes the line along which the uncut material is fed to the blades, but owing to the curvature of the knife blade, the cut material is fed or thrown laterally in the direction in which the blade curves from the point where it first approaches the shear bar. If the material is delivered directly from a feed cutter to a comminuting cylinder, it has been found that a congestion will occur at one end of the cylinder while at the other end of the cylinder there will be almost an entire absence of material to be comminuted.

The object of my invention is to provide a comminuting feed cutter in which the material will be fed laterally while being comminuted in a direction opposite that in which it is fed by an initial cutter.

In the drawings—Figure 1 is a longitudinal sectional view of a feed comminuting apparatus embodying my invention. Fig. 2 is a plan view of the same with a portion of the housing broken away to show the relative arrangement of the cutting blades.

Like parts are identified by the same reference characters in both views.

The material is fed over a table 1, a fragment of which appears in the drawings between feed rollers 2 and 3 and across a shear bar 4 where it is initially cut by a set of blades 5 supported from a shaft 6 by a blade supporting arm 7. These blades operate within a housing having end walls 8, top wall 9 and bottom wall 10, the top wall 9 extending partially around the blades at the rear and having another shear bar 11 across the edge of which the blades swing in an upward direction.

The cut material is delivered downwardly and rearwardly into a chamber 12 having a generally cylindrical form. The outer or peripheral wall 13 of this chamber is perforated as illustrated in the drawings so that the finely divided material may pass therethrough. A shaft 14 extends through this chamber, which I term the comminuting chamber, and a set of blades 15 are supported from the shaft 14 by radial arms 16, similar to the arms 7 which support the blades 5. The blades 15 are also helically curved but in the opposite direction from that in which the blades 5 are curved and the edges of the blades swing in close proximity to the wall 13 through a considerable portion of the circle of rotation, the blades being in proximity to the wall 13 on the under side, the rear side and a portion of the upper side of the chamber. The material cut by the first set of blades 5 will, for the reason above stated, be delivered toward one end of the comminuting chamber and in the construction shown this material will be delivered toward the end at which the gear wheel 20 is located. Said material will be caught by the blades 15 and carried thereby along the inner face of the perforated screen or wall 13 in a helically curved path following a line which is concentric to the axis of the revolving blades and which progressively approaches the other end of the comminuting cylinder. During this movement, the finely comminuted material will escape through the apertures 17 in the wall 13. The larger portions will catch in said apertures and will be cut by the revolving blades if it projects far enough into the cylinder to be struck by them. If not, the material will be swept across the openings by the mass of material carried around by the knives and this effectually breaks up the particles until they drop through the holes.

The comminuting operation is therefore a combined cutting and grading operation. By forming the wall 13 with apertures 17 which are straight sided, it is obvious that the material projecting into the apertures but not sufficiently comminuted to drop through them will readily be broken off by the material swept against it or cut off by the knives. The material in this chamber will of course be pressed outwardly by centrifugal force in the direction of the wall 13. It will therefore travel along the inner face of the wall until all of it has passed through the perforations. It will also be observed that the blades 5 and 15 travel in proximity to each other across the opening between the two chambers, the blades moving in opposite directions so that each is adapted to carry the material against the other. This also facilitates the comminuting operation and assists the blades 5 in carrying the material against the shear bar 11. I attach great importance, however, to the fact that the blades 5 curve in the opposite direction from that in which the blades 15 curve for the reason that I am thereby enabled to utilize the blades 15 to continuously feed the material from the end of the comminuting cylinder which tends to become congested toward the other end, thereby distributing the work throughout the length of the cylinder.

I claim—

1. A comminuting feed cutter, including the combination with an inclosing casing, of a pair of transverse shafts extending therethrough, sets of helically curved spaced blades, one set supported from each shaft, and those of the second set being curved in a direction opposite to that in which the blades of the initial set are curved, a shear bar arranged to coöperate with the blades of the initial set, and means for revolving both shafts in the same direction, the walls of said casing in proximity to the second set of blades being perforated.

2. A feed cutting and comminuting apparatus, including the combination with two substantially parallel sets of oppositely curved helical blades, and means for revolving both sets, of a housing partially inclosing one set of blades and provided with an opening between the sets of blades, a shear bar on each side of the opening, in coöperative relation to the blades of one set, and a perforate screen inclosing all sides of the other set of blades except at said opening, substantially as described.

In testimony whereof I affix my signature in the presence of two witnesses.

ORLANDO C. FRICK.

Witnesses:
WALTER G. FLINT,
JOSEPH DeGUIRE.

Copies of this patent may be obtained for five cents each, by addressing the "Commissioner of Patents, Washington, D. C."